United States Patent
Hereford

[15] 3,679,305
[45] July 25, 1972

[54] MICROFILM RECORDING SYSTEM
[72] Inventor: John R. Hereford, Florissant, Mo.
[73] Assignee: U.S. Dynamics Inc., Elmsford, N.Y.
[22] Filed: Aug. 15, 1969
[21] Appl. No.: 850,606

[52] U.S. Cl. .................................355/65, 95/12, 242/194
[51] Int. Cl. .......................................................G03b 27/32
[58] Field of Search..........................355/64, 65, 18, 27–29, 355/39, 40, 60; 242/194; 95/12

[56] References Cited

UNITED STATES PATENTS

| | | | |
|---|---|---|---|
| 3,460,891 | 8/1969 | Bley et al. | 355/29 |
| 2,578,037 | 12/1951 | Berlant | 355/65 |
| 3,363,966 | 1/1968 | Hoch | 95/18 X |
| 3,434,783 | 3/1969 | Sakaki et al. | 352/72 |
| 3,511,565 | 4/1970 | Harman et al. | 355/64 |

*Primary Examiner*—Samuel S. Matthews
*Assistant Examiner*—Richard A. Wintercorn
*Attorney*—Curtis Ailes

[57] ABSTRACT

The system uses a film cartridge containing film having positioning perforations, and it is operable in each exposure cycle to advance the film before opening the shutter. An interlock is provided to prevent ambient light damage to film records at the cartridge exposure window.

12 Claims, 4 Drawing Figures

INVENTOR.
JOHN R. HEREFORD

BY Curtis Ailes

ATTORNEY

PATENTED JUL 25 1972　　3,679,305

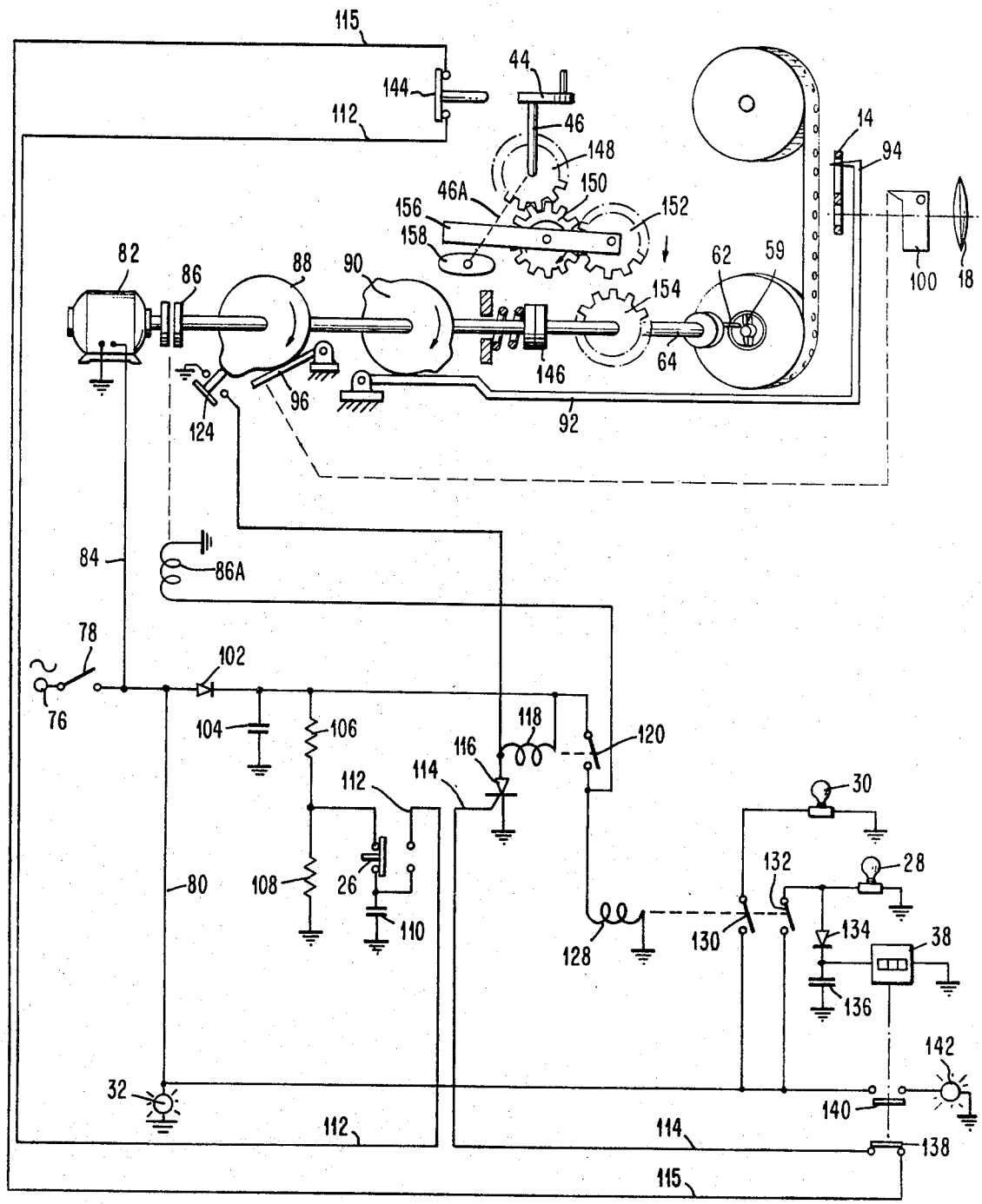

MICROFILM RECORDING SYSTEM

This invention relates to systems for photographically recording information on microfilm, and particularly to microfilm recording systems of the type operable in a succession of individually initiated exposure cycles in each of which the film is advanced by a distance necessary to record a single document in a single document recording exposure cycle.

In a microfilm recording system of the above type it is necessary to accomplish the basic steps of exposing the film and advancing the film for the successful accomplishment of each cycle of operation. It has been conventional in the past to first expose the film and then to advance the film so that the film is left in the proper position for the next succeeding exposure. With film having film positioning perforations, the advance of the film and the final positioning of the film at each indexed position is determined by the position of the perforations. When the film is first inserted into the recording system, the perforations may not be perfectly aligned with the film advancing mechanism so that the first film advance operation may result in a film movement which is less than a full picture "frame" to be exposed. The result is that, with the conventional exposure cycle sequence, the first advance of the film occurring after the first exposure, may not be sufficient to move a full frame of fresh unexposed film into position for the second frame. The result is that the first and second exposures are at least partially overlapped, making both frames defective. This is a serious problem when reliance is to be placed upon accurate recording of documents.

Accordingly, it is one object of the present invention to provide an improved microfilm recording system employing a perforated film strip in which the difficulty of double exposure of the first and second frames is prevented.

In prior microfilm recording systems, it has always been considered necessary to use film no smaller than 16 millimeters in width in order to record an adequate amount of information with proper definition. The optical limitations of small and relatively portable microfilm recording systems have been thought to make it particularly important to use film no smaller than 16 millimeter. However, narrower film strips, such as 8 millimeter width strips, possess many advantages, particularly for small and portable microfilm systems, such as smaller bulk, lower cost, and the possibility of utilizing the film in a standard movie film cartridge.

Accordingly, it is another object of the present invention to provide an improved microfilm recording system in which large documents can be successfully recorded upon narrow strips of film such as 8 millimeter width film.

In prior microfilm recording systems, it has been common to employ raw film on open reels, necessitating that the exposed film must be unloaded, and fresh film reloaded into the camera, in a dark room. This requires that the operator be a person of relatively high skill who does not object to performing these operations in a dark room. It also requires that a dark room must be provided, or dark room conditions must be available in the room housing the recording system. Because the film change is this complicated, it is the custom to provide a large quantity of film on each reel. These customs and requirements necessarily increase the size of the microfilm equipment and decrease the possibility of portability of the equipment. Furthermore, the use of the film in long lengths having a large number of recording frames on each length reduces the convenience of classifying the material as it is recorded by shifting partially used film strips to record different classes of documents on separate film strips.

Accordingly, it is another object of the present invention to avoid the above enumerated disadvantages by providing an improved microfilm recording system which is arranged to employ film which is prepackaged in a film cartridge so that the film is easily changed without employing a dark room, and so that short strips of film can be easily shifted in the machine as they are depleted, or for the purpose of recording documents by categories on particular film strips where the documents are recorded in a random order.

It has previously been thought to be necessary when employing film cartridges in photographic equipment to provide for complete enclosure of the cartridge within the camera or recording system. This necessarily reduces the accessibility of the cartridge and makes the changing of a cartridge a more lengthy procedure. Furthermore, it is not possible to tell from the exterior appearance of the apparatus whether or not a cartridge is actually present in the apparatus.

Accordingly, it is another object of the invention to provide an improved microfilm recording system employing a film cartridge in which the film cartridge is provided with a maximum of visibility and accessibility even when it is in the operating position.

In a photographic apparatus employing a strip film housed in a film cartridge, the cartridge is generally provided with a film exposure aperture and the leader portion of the film is necessarily exposed to ambient light during the loading process. Similarly, the trailer portion of the film is also exposed to ambient light as the cartridge is unloaded. Accordingly, it is necessary to remember to advance the film after loading and before taking the first frame so that no attempt will be made to record the first frame upon the previously exposed leader strip. Similarly, it is necessary to advance the film again after the exposure of the last frame and before the cartridge is unloaded to avoid damaging the last frame by exposing it to ambient light.

It is another object of the present invention to avoid the necessity for the operator to separately initiate the advancing of the film at the lead portions and the trailer portions thereof, making these film advance operations an automatic part of the operation of the system.

Other objects and advantages of the invention will be apparent from the following description and the accompanying drawings.

In carrying out the objects of the invention, in one embodiment thereof, there may be provided a system for photographically recording documents on microfilm and arranged to utilize photographic film in strip form having perforations evenly spaced along one side edge thereof for advancing and positioning the film for successive exposures. The system is operable in discrete individually initiated exposure cycles and includes a shutter operable to open and close on each exposure cycle, and means for engaging the film perforations and operable in each exposure cycle to advance the film before the opening of the shutter to expose the film.

In accordance with another aspect of the invention, the film advancing means is operable in each exposure cycle to advance the film in at least two successive film advancing steps by engaging successive film perforations to provide for a total film advance distance essentially equal to the center to center distance between the film perforations multiplied by the number of successive film advancing steps during each exposure cycle.

In accordance with still another aspect of the invention, there may be provided a microfilm recording system including a housing and a camera lens system and film advance mechanism contained within the housing. The housing includes a recessed portion at the exterior surface thereof for receiving and engaging a light-tight film cartridge having a film exposure window and including means for maintaining a light-tight engagement with the film exposure window of the cartridge so that the cartridge need not be covered to exclude ambient light therefrom.

In accordance with still another aspect of the invention, there may be provided a system for photographically recording documents on microfilm and operable to employ film housed in a prepackaged film cartridge having a window opening therein through which the film is exposed, the film cartridge also being of the type having a take-up spindle and an arrangement for engagement of the take-up spindle from the exterior of the cartridge. The system includes means for receiving and engaging the film cartridge for insertion in a loaded position for exposure of the film for recordation of the documents, and interlock means operable to a closed position after insertion of the film cartridge and operable to an open position prior to removal of the film cartridge. The interlock means is operable to prevent insertion and removal of the film cartridge when the interlock means is in the closed position. The interlock means includes a drive means arranged for connection to the take-up spindle of the film cartridge and operable to advance the film therein whenever the interlock means is moved between the open and closed positions to thereby remove the film within the cartridge window both before and after the recording operation to prevent damage to the photographic record by exposure to ambient light.

Figure 1:
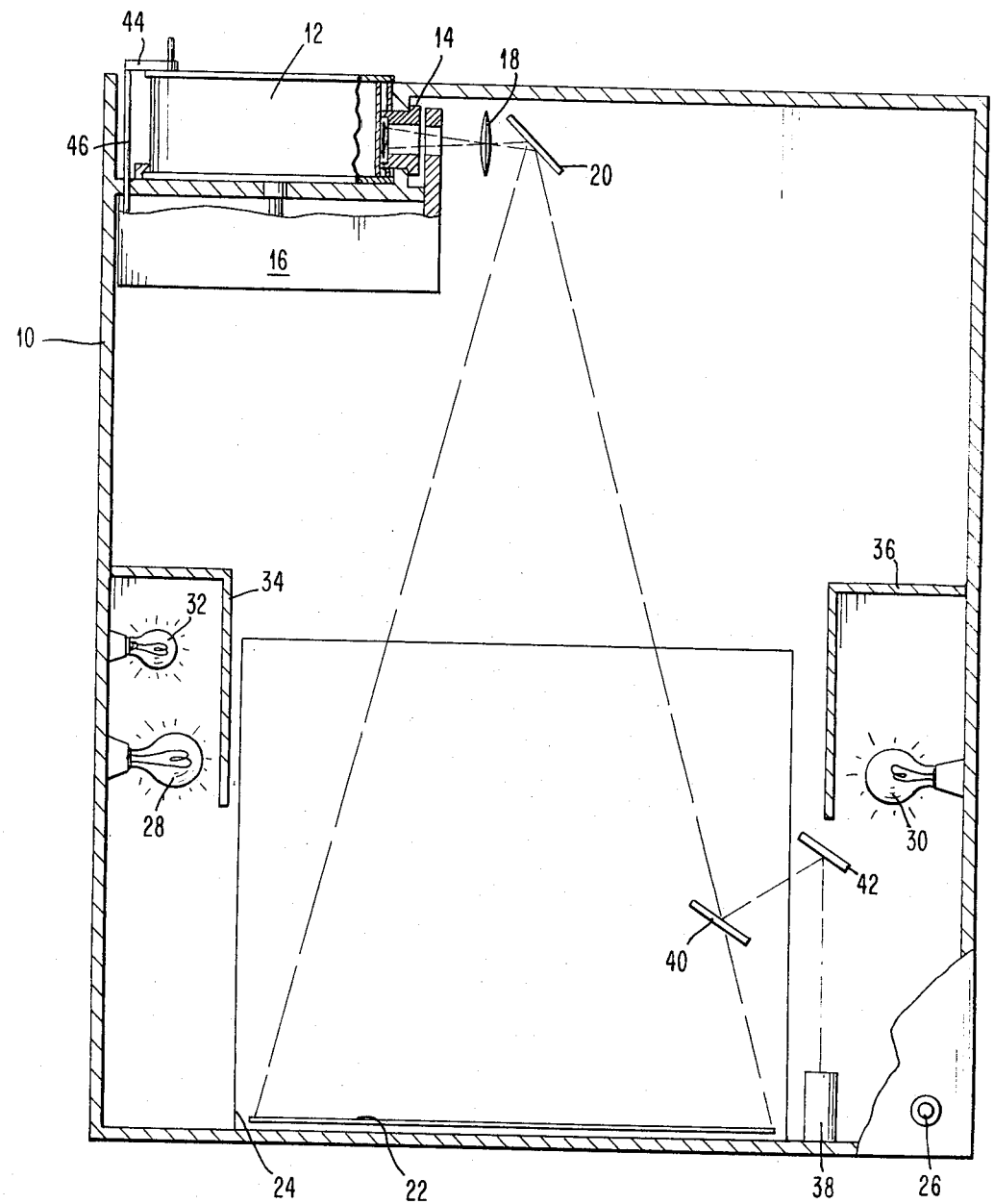
FIG. 1 is a side view, partially in section, illustrating a preferred embodiment of the invention.

And FIG. 4 is a schematic diagram illustrating the mechanical and electrical connections of the operating components of the system of FIG. 1.

Referring more particularly to FIG. 1, the embodiment includes a housing 10 having a recess in the upper portion thereof to receive a film cartridge 12. The film in the cartridge 12 is exposed through an aperture plate 14 and a shutter which comprises a part of the controls 16. The exposure is made through a lens 18 and reflected by a mirror 20 from a document 22 which is supported on the floor of the housing. A door opening 24 is provided in the side of the housing to permit insertion and removal of documents 22 to be recorded. A second door is preferably provided also in the cut-away side of the housing to provide for insertion and removal of documents from both sides.

Each exposure cycle of the system is initiated by the operator by a pushbutton switch 26. While not shown, a separate pushbutton switch is preferably provided on each side of the housing. During the course of each cycle of operation, the controls 16 complete a circuit to turn on electric lamps 28 and 30 to provide a uniform high intensity illumination to the document 22. A pilot light 32 is also provided which is constantly illuminated to enable the operator to load and unload documents 22. The pilot light 32 also indicates that power is on and the apparatus is ready to operate. Hoods 34 and 36 are provided over the lamps 28, 30, and 32 to prevent direct transmission of light from the lamps to the optical system of lens 18.

For the purpose of indexing and classifying the recorded materials, a number is assigned to each document and is photographically recorded with the document. This is provided by a counter 38, the face of which is included in the optical field of the document recording exposure by a combination of small mirrors 40 and 42.

In addition to containing and operating an optical shutter, the controls 16 include film advancing mechanisms, and switches for providing the operating cycle signals to the other elements of the system including the counter 38 and the lamps 28 and 30, as described more fully below in connection with FIG. 4. Of particular importance is a cartridge interlock device 44 which is rotatable to the closed position illustrated in FIG. 1 after insertion of the film cartridge 12. In this closed position, the film cartridge 12 cannot be removed. The interlock device 44 must be rotated to an open position to release the cartridge. This rotation is transmitted through a shaft 46 to the controls 16 and causes the film to be advanced in the cartridge after the last exposure and before the cartridge is removed from the cartridge holding recess in the housing 10. This serves to remove the exposed last frame from the film window of the cartridge 12. It thus avoids damaging the last film frame by exposure to ambient light.

When a new cartridge 12 is placed in the recess, and before the first record is made, the interlock device 44 must again be rotated into the closed position as illustrated in the drawing. This rotation again operates through shaft 46 to cause the film to be advanced in the window of the cartridge so that the first picture frame is recorded upon film which has not been exposed to ambient light as the cartridge was placed in the apparatus. This feature will be described more fully below in connection with the other figures.

Figure 2:
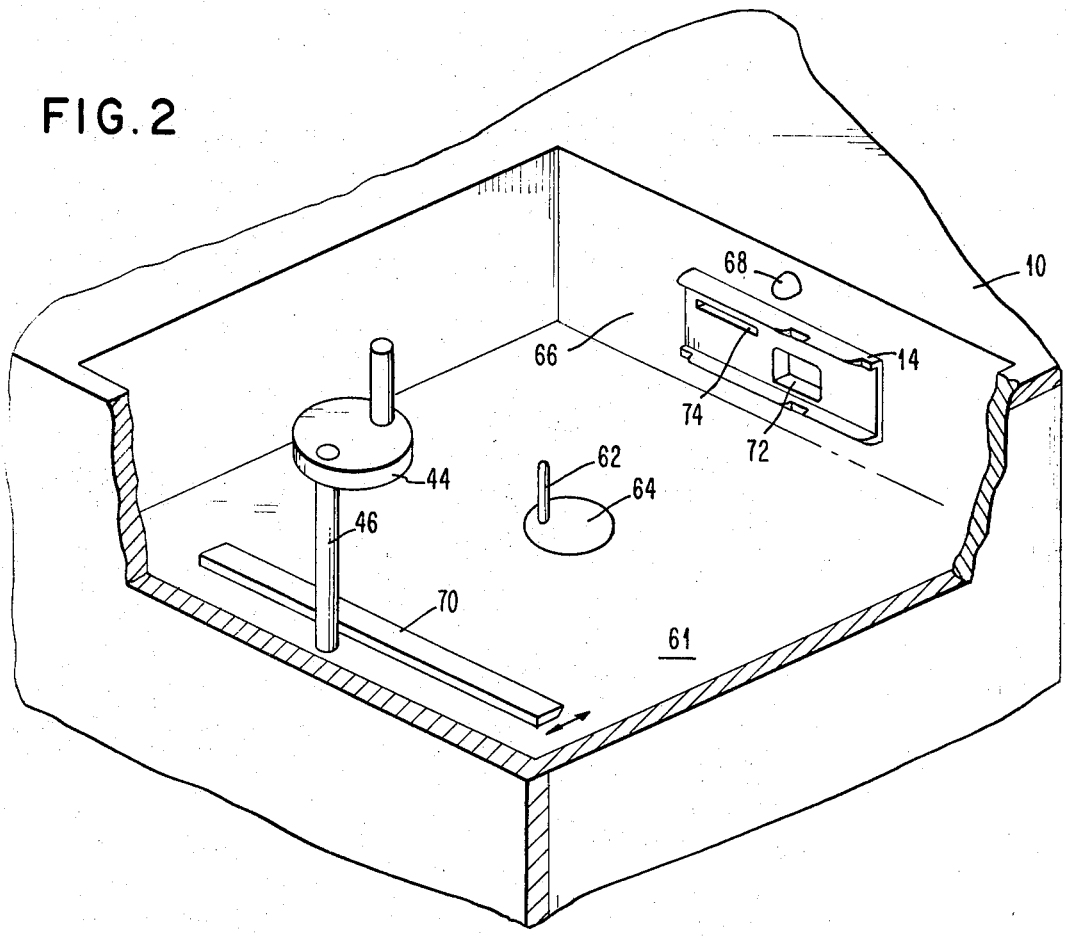
FIG. 2 is a detail view of the film cartridge holding recess portion of the embodiment of FIG. 1.

FIG. 2 is a top perspective view showing details of the film cartridge receiving recess within the housing 10.

Figure 3:
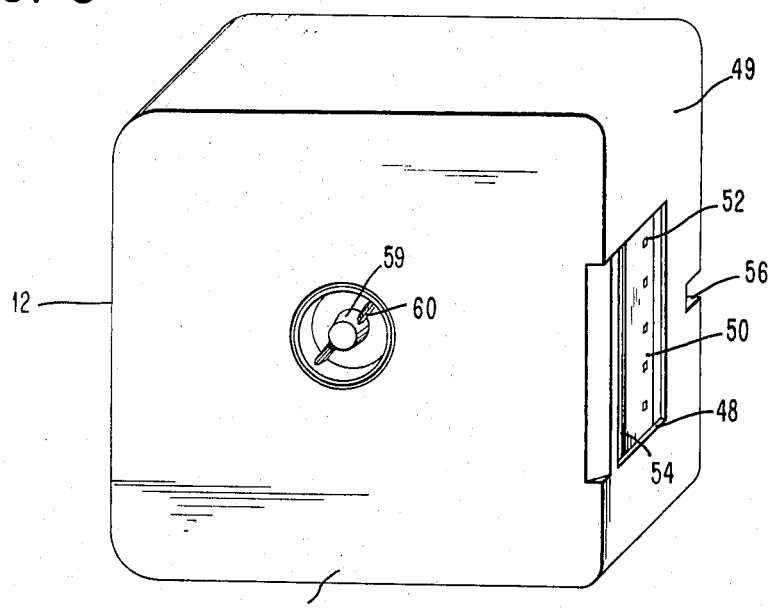
FIG. 3 is a perspective view of a film cartridge of the type which may be employed with the embodiment of the invention shown in FIG. 1.

FIG. 3 is a bottom perspective view of a typical film cartridge which is employed with the system of the present invention. Since the features of the cartridge receiving recess are closely related to the structure of the cartridge, these two figures are described concurrently hereinafter. The cartridge 12 of FIG. 3 is provided with a film exposure window 48 in a front face 49 thereof for exposure of the film 50. The film is advanced through the window 48 by engagement of a film advance finger in successive perforations 52 at the side edge of the film. Arranged in the window 48 and behind the film is a spring biased pressure plate 54 which maintains a secure closure for the window so as to avoid admitting ambient light to the remainder of the film within the cartridge. Arranged at the top of the cartridge in the front face 49 there is a positioning slot, as indicated at 56. In the bottom face 58 of the cartridge, there is a take-up spindle 59 which is exposed to the exterior of the cartridge so that the film can be wound up on the take-up spindle as it is advanced through the window. For this purpose, the spindle 59 includes a cross vane 60 which can be easily engaged by a drive pin 62 protruding from a drive spindle 64 in the bottom surface of the cartridge receiving recess illustrated in FIG. 2.

When the cartridge 12 is to be placed in the recess, the interlock 44 must be rotated to the open position. It is illustrated in FIG. 2 in the closed position. This interlock will normally be in the open position when the recess is empty. The cartridge is then placed in the recess by first lowering the front face 49 into position against the front face 66 of the recess, and engaging the positioning slot 56 over a positioning pin 68 which protrudes from the front face 66 of the recess. Then, while maintaining the upper edge of the front face 49 of the cartridge 12 against the front face 66 of the recess, the back of the cartridge is lowered into the recess so that the bottom surface 58 of the cartridge engages with the bottom surface 61 of the recess. To accomplish this position, a clamping device 70, which is normally spring biased towards the front face 66 of the recess must be retracted towards the back of the recess. When this clamping plate 70 is then released, it engages the bottom edge of the cartridge and maintains the cartridge in the precise position required for operation. The interlock 44 is then rotated into the closed position illustrated in FIG. 2.

As the cartridge is rotated into the assembled position, the aperture plate 14 actually enters and closely fits into the cartridge window 48, engaging at the side edges thereof with the cartridge pressure plate 54 to push the pressure plate 54 back into the cartridge to release the film for easy movement through the window 48. It is one of the most important features of this invention that the tight fit of the front face 49 of the cartridge 12 with the front face 66 of the recess, and the close physical cooperation of the aperture plate 14 in the cartridge window 48 combine to provide a light-tight seal so as to make it unnecessary to provide a light-tight cover for the cartridge when it is contained in the recess. As a further precaution, the front face 66 of the recess may be provided with a surface of a resilient material such as rubber, or a rubber-like material to provide a closely conforming light-tight seal with the front face 49 of the cartridge.

The aperture plate is provided with a slot 74 through which a film advancing finger protrudes and engages the film perforations to advance the film just before each exposure thereof. The film advancing mechanism is a part of the controls 16 of FIG. 1. These controls are shown in detail in FIG. 4 and are described below in connection with that figure.

The aperture plate 14 is provided with a physical aperture 72 which precisely determines the area of film which is exposed on each exposure. In accordance with one feature of this invention, this aperture is elongated, extending over essentially the film length which would normally be encompassed by at least two picture "frames" on the film strip. By this means, documents which are as long as 14 inches may be conveniently recorded on 8 millimeter film with a reduction ratio which does not exceed 40 to 1.

The system of the present invention is particularly well adapted to the use of film in cartridges which are conventionally referred to in the trade as "Super 8 Motion Picture Film Camera Cartridges."

The sequence of operations of the preferred embodiment of the recording system of the present invention is as follows:

1. A fresh film cartridge 12 (FIG. 3) is placed in the film cartridge recess (FIG. 2) of the housing 10 in the apparatus as shown in FIG. 1.
2. The interlock 44 is rotated into the closed position.
3. The document 22 to be recorded is inserted through the opening 24 in the housing 10 and carefully positioned for recording on the floor of the housing 10.
4. Pushbutton 26 is operated to thereby initiate the following automatic cycle of operations:
   a. The lamps 28 and 30 are turned on to illuminate the document area.
   b. The film is advanced by an amount sufficient to record one "frame" image on the film.
   c. A shutter is opened and closed to make the photographic exposure to record the document.
   d. Lamps 28 and 30 are turned off (completing the automatic cycle of operation). In one physical embodiment of the invention, this complete automatic operating cycle of the system is completed in only 1 second.
5. The document 22 is removed.
6. Steps 3, 4, and 5 are repeated to record as many documents as desired up to the capacity of the film in the cartridge 12.
7. The interlock 44 is rotated to the open position.
8. The film cartridge 12 is removed for photographic development.

FIG. 4 is a detailed schematic diagram illustrating the automatic sequencing controls for a preferred embodiment of the system in accordance with the present invention. Power is supplied from a conventional source of alternating current voltage at terminal 76 through a main power switch 78. Whenever switch 78 is closed, the pilot lamp 32 is continuously energized through connection 80, and an electric motor 82 is continuously energized through a connection 84. Whenever an exposure cycle is initiated, and electromagnetic clutch 86 is engaged for rotation for one full revolution by motor 82. This rotation is thus imparted to tow operating cams 88 and 90. The cam 90 operates against a lever 92 to move a film advancing finger 94 in two film advancing movements in response to the two raised portions of the cam 90. The film advancing finger 94 accomplishes this by engaging in the film perforations. Thus, the film is advanced by a distance corresponding to twice the spacing between successive film perforations. After the film advance is completed, the raised portion of cam 88 actuates an associated lever 96. Lever 96 is mechanically connected by a connection schematically shown by a dotted line 98 to operate a pivoted shutter 100. Levers 92 and 96 are biased against the associated cams by means of suitable springs (not shown). The shutter 100 is also spring biased to the closed position and the shutter biasing spring may also serve the purpose of baising the lever 96 against the cam 88. The film advancing finger 94 is spring biased into the film perforations, and is provided with suitable camming means (not shown) for lifting the finger out of each perforation at the end of the advancing travel so that the finger may be moved over to the next perforation. The operating lever 92 is shown in a distorted elongated form for purposes of clarity in the schematic representation.

The electrical controls for providing the above described operation of the system include a rectifier 102 for providing a direct current source of power. A capacitor 104 is preferably included to smooth the rectifier output. A portion of the rectified DC power is supplied through a voltage divider including resistors 106 and 108, and through the normally closed contacts of actuating switch 26 to charge a control capacitor 110. When switch 26 is operated to the start position, the charge voltage from capacitor 110 is connected through a conductor 112, and thus normally to an associated conductor 114 to the control electrode of a silicon controlled rectifier 116 to thereby initiate conduction in that rectifier. The conduction in silicon controlled rectifier 116 energizes relay 118 to close a relay contact 120. Contact 120 thus completes a circuit to supply power through a connection 122 to the winding 86A of the electromagnetic clutch 86 to thereby engage the clutch to commence the rotation of cams 88 and 90.

As cam 88 commences rotation, the raised portion thereof disengages from a cam operated switch 124 to close a circuit through connection 126 which is in parallel with the silicon controlled rectifier 116. Thus, the apparatus is maintained in an energized condition by the switch 124 after initial commencement of rotation of cam 88 independent of the silicon controlled rectifier 116 and the initiating pushbutton switch 26. At the end of the single revolution of the cams 88 and 90, the cam 88 again opens the switch 124 to de-energize the relay 118, resulting in de-energization of the electromagnetic clutch 86 to end the cycle of automatic operation.

The triggering on of the silicon controlled rectifier 116 by pushbutton switch 26 depends upon the discharge current from capacitor 110. Accordingly, if the operator fails to release the pushbutton 26, the reopening of the cam switch 124 is still effective to end the operating cycle because the capacitor 110 has already been discharged to initiate the operation and is no longer effective to continue with a second initiation of conduction in the silicon controlled rectifier 116. Thus, in order to initiate another cycle, the pushbutton 26 must be released to recharge capacitor 110 through the normally closed pushbutton contacts, and then the pushbutton 26 must again be moved into the cycle-initiating position. This single shot feature of the circuit associated with pushbutton 26 is quite important because it avoids wasting film in making unwanted extra film records of each document.

During the operating cycle, while relay 118 is energized, the closure of relay contact 120 is also effective to energize a second relay 128, closing associated contacts 130 and 132 to energize lamps 28 and 30. While only two lamps are illustrated here, it will be understood that additional lamps may be employed as necessary to achieve the desired quantity and distribution of illumination. The counter 38 is also connected for energization from relay contact 132 through a rectifier 134, the rectifier output being smoothed by a capacitor 136. The counter 38 preferably includes switch contacts 138 which are operable to the open position when the counter accumulates a count corresponding to the number of documents which can be recorded on a single roll of film. The opening of contacts 138 interrupts the connection between conductors 112 and 114 (at an associated conductor 115) to thereby disable the starter pushbutton switch 26 from further energization of the silicon controlled rectifier 116. The counter switch of counter 38 also preferably includes normally open contacts 140 which are operable at the end of the film to energize an indicator lamp 142 to indicate to the operator that a new film cartridge is required. After the new film cartridge is loaded, the counter 38 is reset to operate the switches 138 and 140 to the normal positions shown.

When the cartridge interlock 44 is rotated to the open position, it engages and opens a normally closed switch 144 which is operable to disconnect the normally closed connection between conductors 112 and 115 to thereby disable the cycle initiating pushbutton 26 whenever the interlock 44 is in the open position. Thus, the system cycle cannot be initiated unless film is present and the operator cannot gain the wrong impression that photographic records are being made when no film is present for such recordings. The arrangement of switch 144 with the interlock 44 is shown in a schematic representation. In the actual preferred physical embodiment, the interlock lever 44 does not directly engage the switch 144, but a suitable operating cam is provided within the apparatus to engage the switch 144 and the cam is rotated by the interlock shaft 46.

The shaft of the cams 88 and 90 is connected through a low torque friction clutch 146 which drives the take-up spindle shaft 64 having the take-up drive pin 62 connected to the take-up spindle 59 of the cartridge. The friction clutch 146 is designed to provide only enough torque to advance the take-up spindle 59 of the cartridge to wind up the amount of film advanced by the film advance finger 94. Thus, the torque of this friction clutch is not sufficient to advance film through the cartridge exposure window independent of the operation of film advancing finger 94.

As previously mentioned, the interlock 44 is effective through rotation of the shaft 46 to provide for an advancement of the film at the beginning and at the end of operations with each cartridge. These film advancing operations are accomplished through driving gears 148, 150, 152, and 154. The last of these gears, 154, is rigidly attached to the take-up shaft 64. The center pivot of gear 150 is fixed and serves as a pivotal support for a swinging arm 156 supporting gear 152. An extension 46A of interlock shaft 46 is connected to rotate a cam 158. The rotation of cam 158 causes a clockwise movement of arm 156 about the center pivot of gear 150 to cause the gear 152 to move into engagement with the gear 154 to drive the shaft 64 and the film forward by the prescribed amount. Thus, the rotation of the interlock 44 not only drives the train of gears 148, 150, 152, but it operates the cam 158 to cause the driven gear 152 to engage the gear 154. While not illustrated in the drawing, the interlock 44 is preferably provided with a one-way clutch means so that it must always be rotated between the open and closed positions only in one direction, the direction required for advancing the film. Furthermore, since the film is always subjected to an additional automatic cycle film advancing operation just before the first exposure, the interlock 44 is preferably designed to provide a slightly shorter film advance for the movement from the open to the closed position in comparison with the movement from the closed to the open position. A detent stop means is preferably provided to exactly determine the "open" and "closed" positions of the interlock 44.

The shaft of the cams 88 and 90 between the electromagnetic clutch 86 and the friction clutch 146 is intentionally provided with sufficient friction so that the film advancing operation from the interlock 44 cannot be transmitted back through the friction clutch 146 to cause a "false" automatic operation of the system through closure of cam switch 124.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A system for photographically recording documents and arranged to utilize photographic film in strip form having perforations evenly spaced along one side edge thereof for advancing and positioning the film for successive exposures, said system including starting means to be separately actuated for each document to be copied, said system being operable in discrete exposure cycles each individually initiated by a separate actuation of said starting means, said system including a shutter operable to open and close on each exposure cycle, means for engaging said perforations and operable in each exposure cycle to advance the film before the opening of said shutter to expose the film, the system being adapted to employ film housed in a pre-packaged film cartridge having a window opening therein through which the film is exposed, the film cartridge being of the type having a take-up spindle and an arrangement for engagement of the take-up spindle from the exterior of the cartridge, and wherein there is provided a drive means arranged for connection to the take-up spindle of the film cartridge and operable to advance the film therein to remove the film within the cartridge window before the recording operations to prevent damage to the photographic record by exposure to ambient light, said drive means being physically separate from and operable independently from said means to advance the film in each exposure cycle.

2. A system for photographically recording documents and arranged to utilize photographic film in strip form having perforations evenly spaced along one side edge thereof for advancing and positioning the film for successive exposures, said system including starting means to be separately actuated for each document to be copied, said system being operable in discrete exposure cycles each individually initiated by a separate actuation of said starting means, said system including a shutter operable to open and close on each exposure cycle, means for engaging said perforations and operable in each exposure cycle to advance the film before the opening of said shutter to expose the film, said film advancing means being operable in each exposure cycle to advance the film in at least two successive film advancing steps by engaging successive film perforations to provide for a total film advance distance essentially equal to the center-to-center distance between film perforations multiplied by the number of successive film advancing steps during each exposure cycle.

3. A system for photographically recording documents and arranged to utilize photographic film in strip form having perforations evenly spaced along one side edge thereof for advancing and positioning the film for successive exposures, said system including starting means to be separately actuated for each document to be copied, said system being operable in discrete exposure cycles each individually initiated by a separate actuation of said starting means, said system including a shutter operable to open and close on each exposure cycle, means for engaging said perforations and operable in each exposure cycle to advance the film before the opening of said shutter to expose the film, said starting means comprising an exposure cycle initiating push-button switch normally biased to a noninitiating position and operable to a cycle initiating position by the operator, said system being operable to initiate a cycle only in response to a sequence including the release of said switch followed by the operation of said switch to the cycle initiating position.

4. A system as claimed in claim 3 including a control circuit associated with said switch including a capacitor connected to be charged through connections established by said switch in the non-initiating position, said circuit also including means operable to initiate the cycle in response to discharge current from said capacitor, said switch being operable in the cycle initiating position to discharge said capacitor through said last-named means.

5. A system for photographically recording documents and arranged to utilize photographic film in strip form having perforations evenly spaced along one side edge thereof for advancing and positioning the film for successive exposures, said system including starting means to be separately actuated for each document to be copied, said system being operable in discrete exposure cycles each individually initiated by a separate actuation of said starting means, said system including a shutter operable to open and close on each exposure cycle, means for engaging said perforations and operable in each exposure cycle to advance the film before the opening of said shutter to expose the film, a counting means for counting the number of exposure cycles through which said system is operated, and switch means operable in response to said counting means for preventing the initiation of further exposure cycles after said counting means has counted a number of exposure cycles corresponding to the maximum capacity of an individual photographic film strip.

6. A microfilm recording system comprising a housing, a camera lens system and film advance mechanism contained within said housing, said housing including a recessed portion at the exterior surface thereof for receiving and engaging a light-tight film cartridge having a film exposure window, said recessed portion including means for maintaining a light-tight engagement with the film exposure window of the cartridge so that the cartridge need not be covered to exclude ambient light therefrom, said means for maintaining a light-tight engagement with the film exposure window of the cartridge including a front face of said recessed portion arranged to engage snugly with the portions of the film cartridge surrounding the film exposure window thereof, and a spring biasing means for maintaining a spring biased engagement with said film cartridge to force the film cartridge against the front face of said recessed portion of said housing to maintain firm engagement therewith.

7. A system as claimed in claim 6 wherein said front face of said recessed portion comprises a compressible rubberlike material for engagement in a light-tight seal with the film cartridge.

8. A system as claimed in claim 6 wherein the optical path of said camera lens system includes a reflector for providing a right angle bend in the optical path to thereby reduce the outer dimensions of said housing.

9. A system as claimed in claim 6 wherein the system is operable in discrete document recording cycles, and wherein there is provided a counter operable to change the count stored therein upon the operation of said system for each discrete document recording cycle, and reflective means arranged in the edge of the field of view of said camera lens system for reflecting an image of the face of said counter to thereby photographically record the count stored in said counter together with the document being recorded on each exposure cycle.

10. A system for photographically recording documents on microfilm and operable to employ film housed in a prepackaged film cartridge having a window opening therein through which the film is exposed, the film cartridge being of the type having a take-up spindle and an arrangement for engagement of the take-up spindle from the exterior of the cartridge, said system including means for receiving and engaging said film cartridge for insertion in a loaded position for exposure of said film for recordation of the documents, interlock means operable to a closed position after insertion of the film cartridge and operable to an open position prior to the removal of the film cartridge, said interlock means being operable to prevent insertion and removal of the film cartridge when said interlock means is in the closed position, and said interlock means including drive means arranged for connection to the take-up spindle of the film cartridge and operable to advance the film therein whenever said interlock means is moved between the open and closed positions to thereby remove the film within the cartridge window both before and after the recording operations to prevent damage to the photographic record by exposure to ambient light.

11. A system as claimed in claim 10 wherein the advance of the film by said interlock means is greater during movement from the closed to the open position than it is for movement from the open to the closed position.

12. A system as claimed in claim 10 wherein said interlock means includes means to prevent operation of said system in a document recording cycle when said interlock means is in the open position.

* * * * *